United States Patent
Mathur et al.

(10) Patent No.: US 11,625,282 B2
(45) Date of Patent: Apr. 11, 2023

(54) SYSTEMS AND METHODS OF REMOTE MACHINE LEARNING TRAINING WITH REMOTE SUBMISSION AND EXECUTION THROUGH A CODING NOTEBOOK

(71) Applicant: HEWLETT PACKARD ENTERPRISE DEVELOPMENT LP, Houston, TX (US)

(72) Inventors: Kartik Mathur, Santa Clara, CA (US); Ritesh Jaltare, Bangalore (IN); Saurabh Jogalekar, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 419 days.

(21) Appl. No.: 16/816,248

(22) Filed: Mar. 11, 2020

(65) Prior Publication Data

US 2021/0286657 A1    Sep. 16, 2021

(51) Int. Cl.
| | |
|---|---|
| G06F 9/50 | (2006.01) |
| G06F 9/54 | (2006.01) |
| G06F 16/901 | (2019.01) |
| G06N 20/00 | (2019.01) |

(52) U.S. Cl.
CPC .......... *G06F 9/5077* (2013.01); *G06F 9/5027* (2013.01); *G06F 9/54* (2013.01); *G06F 16/9027* (2019.01); *G06N 20/00* (2019.01)

(58) Field of Classification Search
CPC ......... G06F 9/5077; G06F 9/5027; G06F 9/54
See application file for complete search history.

(56) References Cited

U.S. PATENT DOCUMENTS

| | | | |
|---|---|---|---|
| 2016/0260023 A1* | 9/2016 | Miserendino, Jr. | .... G06N 20/00 |
| 2017/0208138 A1 | 7/2017 | Baxter | |
| 2019/0384649 A1* | 12/2019 | Wen | ........................ G06F 9/445 |

OTHER PUBLICATIONS

Duong, Ta Nguyen Binh. FC2: cloud-based cluster provisioning for distributed machine learning. Springer., pp. 1299-1315. Retrieved From the Internet <https://link.springer.com/content/pdf/10.1007/s10586-019-02912-6.pdf> (Year: 2019).*

* cited by examiner

*Primary Examiner* — Emerson C Puente
*Assistant Examiner* — Jonathan R Labud
(74) *Attorney, Agent, or Firm* — Sheppard Mullin Richter & Hampton LLP

(57) ABSTRACT

Systems and methods are provided for remote submission and execution of machine learning models. Embodiments in accordance with the present disclosure enable an instance of a notebook client running on a user terminal to remotely submit model code entered into the cells of the instance to a selected training cluster. The instance is instantiated without configuring the instance with a specific compute engine. A management system communicatively coupled to the user terminal and the training clusters maintains a data structure including configuration parameters for the training clusters. The instance receives a selection of a training cluster and is provided with the configuration parameters from the management system for the selected training cluster for attaching the training cluster to the instance.

20 Claims, 5 Drawing Sheets

SYSTEMS AND METHODS OF REMOTE MACHINE LEARNING TRAINING WITH REMOTE SUBMISSION AND EXECUTION THROUGH A CODING NOTEBOOK

DESCRIPTION OF RELATED ART

An increasing number of data-intensive distributed applications are being developed to serve various needs, such as processing very large data sets that generally cannot be handled by a single computer. Clusters of computers are employed to distribute various tasks, such as organizing and accessing the data and performing related operations with respect to the data. Various applications and frameworks have been developed to interact with such large data sets, including Hive, HBase, Hadoop, Spark, and TensorFlow, among other large-scale processing environment frameworks.

At the same time, virtualization techniques have gained popularity and are now commonplace in data centers and other computing environments in which it is useful to increase the efficiency with which computing resources are used. In a virtualized environment, one or more virtual nodes are instantiated on an underlying physical computer and share the resources of the underlying computer. Accordingly, rather than implementing a single node per host computing system, multiple nodes may be deployed on a host to more efficiently use the processing resources of the computing system. These virtual nodes may include full operating system virtual machines, Linux containers, such as Docker containers, jails, orchestration systems, e.g., Kubernetes, or other similar types of virtual containment nodes.

Computational notebooks (also referred to as notebook interfaces) are web applications that allow a data scientist to create and share documents that contain live code, equations, visualizations, and narrative text defining an application. These notebooks can be used for generating applications for cleaning and transforming data, numerical simulation, statistical modeling, data visualization, machine learning, among other uses. Programmers are capable of writing programs with a combination of source code, macros, and natural language explanations of logic using the computational notebooks, which may be used to generate compilable source code for execution. Such environments combine the functionality of a word processing application with a user interface and underlying executable infrastructure associated with a particular programming language associated with the computational notebook (e.g., a kernel).

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
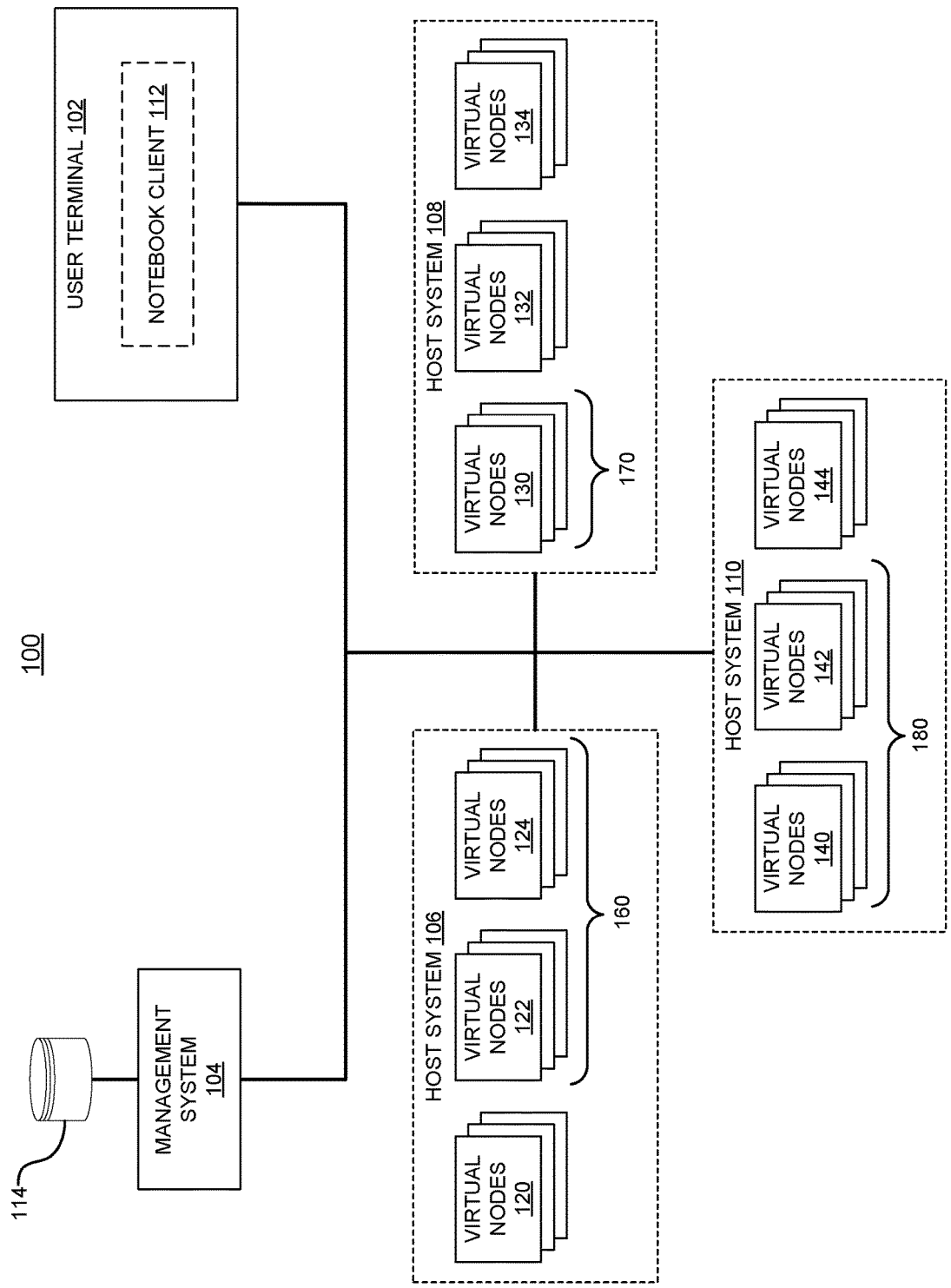
FIG. 1 is an example environment in accordance with embodiments of the technology disclosed herein.

The figures are not exhaustive and do not limit the present disclosure to the precise form disclosed.

DETAILED DESCRIPTION

Computational notebooks are commonly used by data scientists to develop and write machine learning models for performing a variety of different machine learning approaches, such as neural networks. Generally, each instance of a computational notebook application (i.e., each notebook session) is configured to execute within the context of an associated compute engine (i.e., within a given large-scale processing environment framework, such as Apache Hadoop, Apache Spark, TensorFlow, Disco, etc.). Each of these different compute engines have their own specific runtime libraries and other software necessary to execute code.

Most computational notebooks require that a notebook application is loaded onto the cluster within a system where the training computation needs to occur. This includes the required runtime libraries, which utilizes local storage of the system. This is required because each notebook is instantiated specifically for a given compute engine, meaning that the notebook is agnostic as to the required training libraries. The application programmer or data scientist can simply submit the code for training and the notebook can execute the training locally as the notebook was specifically instantiated for that compute environment. Therefore, each notebook instance is specific to a given compute engine, with the coder or data scientist having configured the given instantiation for that particular training environment (i.e., the compute engine and the associated compute resources of the hardware/software platform).

Although the runtime libraries for more than one compute engine may be stored on the local filesystem, multiple notebook sessions would need to be instantiated, one for each compute engine, because of the agnostic nature of the computational notebook applications. In order for a user to run a given programming model (e.g., machine learning model) within a different compute engine, the user must start a new notebook session and reenter the source code, macros, and natural language logic into the notebook cells to define the model within the context of the different compute engine. Each different compute engine has different configuration parameters that must be identified to define the environment, which are used to attach the notebook to the proper compute engine.

Because each notebook session requires associated runtime libraries and configuration corresponding to a specific compute engine, it is difficult to effectively design and train a machine learning or other big data model for different contexts. For example, a user may open a notebook session and design a machine learning model using TensorFlow. A user would need to attach the notebook session to a TensorFlow environment by entering specific configuration parameters. Once configured, the notebook session is capable of testing the model within the TensorFlow compute engine. If the user wants to train the model using a different compute engine, such as Apache Hadoop, the user would need to instantiate a new notebook session and configure the notebook to work within a Hadoop environment. If the user does not have the required runtime libraries stored locally on the training cluster, the notebook session cannot be attached to a Hadoop environment because the notebook would not be capable of converting the notebook cell content into executable code. Generally, computational notebook applications are not aware of the processing framework of interest, which is why each notebook session must be tightly coupled to a specific compute engine in order to convert the cell content.

Embodiments of the technology disclosed herein provide systems and methods for remote submission and execution of code through a computational notebook. Rather than requiring each notebook session to be tightly coupled to a specific compute engine, the embodiments described herein provide an environment with a plurality of different training clusters, each of the training clusters configured with all the necessary runtime libraries and other configuration parameters for a given computational framework (e.g., TensorFlow, Hadoop, etc.). In various embodiments, each training cluster is identifiable such that a data scientist (at the time of submission) can select the training cluster to which the notebook contents are to be submitted and executed. Upon selecting the intended training cluster, the system can attach the training cluster to the running instance of the notebook by configuring the instance with the configuration parameters for the chosen training cluster (which are maintained by a management system within the environment). In this way, instead of configuring the notebook instance at instantiation (and thereby tightly coupling the given instance to only that compute engine), embodiments of the technology disclosed herein allow data scientists to submit the contents of the same notebook instance (or session) to multiple training clusters (i.e., different compute engines) by attaching and detaching different training clusters. Accordingly, all of the runtime libraries need not be maintained locally with the running instance of the notebook client, reducing the memory resources required at the user terminal and providing greater flexibility in implementation.

FIG. 1 illustrates an example environment 100 in which embodiments of the technology disclosed herein are practiced. The environment 100 is provided for illustrative purposes only and is not intended to limit the scope of the technology to only the depicted environment. As shown in FIG. 1, the environment 100 includes a user terminal 102, a management system 104, and a plurality of host systems 106, 108, 110, all communicatively coupled to each other over a communications network. The solid black line connecting the various elements of environment 100 may be a wired connection, a wireless connection, or a combination thereof, depending on the implementation. In various embodiments, the environment 100 may be implemented in a private cloud, a public cloud, a hybrid cloud, or other type of communications network.

The environment 100 provides a platform for designing and training machine learning models or other data processing models remotely so that the model designer can remotely submit code through a notebook client 112 (running on user terminal 102) without the need for the training libraries and other software necessary for a given compute engine to be locally loaded onto the user terminal 102. In some embodiments, the user terminal 102 can be one or more types of computing devices, including but not limited to a laptop, a desktop, a tablet, a server, among others. In various embodiments, the user terminal 102 can also be realized as another host system (similar to host systems 106, 108, 110) within the environment 100 (i.e., also referred to as a "notebook cluster"). It should be noted that such a host system may also be outside the environment 100, provided the environment 100 has the ability to connect to the host system via a network link (as described in greater detail below). For example, the host system may comprise a personal computer which is capable of accessing the environment 100 and may have a notebook client 112 setup. The notebook client can be equipped with necessary software configurations to make the notebook client 112 accessible to communicate with the environment 100. When implemented as a notebook cluster, the user terminal 102 can comprise a plurality of virtual nodes (similar to the virtual nodes discussed below with respect to the host system 106, 108, 110) that represent the notebook cluster within environment 100. The notebook client 112 can be one of a plurality of different computational notebooks known in the art for use by data scientists to design and test machine learning models or other data analytics models. The computational notebook used need merely provide "code" (i.e., the contents of the various cells, whether live code, equations, visualizations, and/or narrative text) and the embodiments discussed herein can make available as needed, the metadata associated with the API server of a given training cluster. In various embodiments, the computational notebook can be a web application (or any integrated development environment (IDE)) through which the notebook cell contents can be shared.

As suggested by its name, the management system 104 manages the environment 100. The management system 104 can be configured to deploy clusters within the environment 100 using the host systems 106, 108, 110. These clusters may each comprise one or more virtual nodes to process data sets in parallel and perform specific operations within the environment 100. The clusters may deploy data processing frameworks or applications that may comprise Hadoop, Spark, TensorFlow, or other distributed data processing framework (i.e., compute engine). In various embodiments, storage repositories may be located on one or more other computing systems, such as server computers, desktop computers, or some other computing systems. The storage repositories may each represent data stored as a distributed file system, as object storage, or as some other data storage structure. Each training cluster can be have an associated application programming interface (API) server configured for dependent distribution to allocate large-scale processing clusters in the environment 100, such as the dependent distribution described in U.S. Patent Publication No. 2017/0208138 titled "Allocating Edge Services With Large-Scale Processing Framework Clusters," which is hereby incorporated herein in its entirety.

The management system 104 can be configured to deploy one or more training clusters. It should be understood that machine learning algorithms may build a mathematical model based on sample data, commonly referred to as training data. When building a mathematical model from training data, referred to as machine learning training, the set of compute hosts used during this phase can be referred to as training clusters. In deploying the clusters, the management system 104 may be responsible for allocating computing resources of the host systems 106, 108, 110 to the clusters, and deploying the virtual nodes required for the clusters. The management system may also handle an orchestration framework like, but not limited to Kubernetes, with the orchestration framework, in turn, being responsible for allocating compute resources to the host systems. As a non-limiting example, the management system 104 can deploy a TensorFlow cluster 160 called "TensorFlow1" on virtual nodes 122 and 124 of the host system 106, a Spark cluster 170 called "Spark1" on virtual nodes 130 of the host system 108, and another Spark cluster 180 called "Spark2" on virtual nodes 140 and 142 of the host system 110. Although discussed with respect to TensorFlow1, Spark1, and Spark2 (collectively, "the training clusters"), the number and type of training clusters deployable within the environment 100 by the management system 104 are not limited only to the examples. In other embodiments, a plurality of training clusters can be deployed within the environment 100, each training cluster 160, 170, 180. In some embodiments, more than one training cluster 160, 170, 180 may be deployed on the same host system. As a non-limiting example, TensorFlow1 and Spark1 may both be deployed on different virtual nodes of host system 106 (e.g., TensorFlow1 on virtual nodes 122 and 124, Spark1 on virtual nodes 120). The virtual nodes may comprise full operating system virtual machines or containers. The containers may comprise Linux containers, Docker containers, and other similar namespace-based containers. Rather than requiring a separate operating system, which is required for virtual machines, containers may share resources from the host computing system, wherein the resources may include kernel resources from the host operating system and may further include repositories and other approved resources that can be shared with other containers or processes executing on the host. However, although resources may be shared between the containers on a host system, the containers are provisioned to have private access to the operating system with their own identifier space, file system structure, and network interfaces. The operating system may also be responsible for allocating processing resources, memory resources, network resources, and other similar resources, to the containerized endpoint.

For managing the environment 100, the management system 104 can maintain a data structure that can be used to store configuration information associated with the compute engine associated with a deployed training cluster (e.g., TensorFlow1, Spark1, Spark2, etc.). The at least one data structure may be stored in a database 114 communicatively coupled to the management system 104. The database 114 can comprise a file system associated with the management system 104. In some embodiments, management system 104 may be deployed as a separate cluster of computing devices within the environment 100, as a cluster of virtual nodes on a host system (e.g., host system 110), or a combination thereof. The database 114 can be one or more local, non-transitory, machine-readable storage media associated with the management system 104, one or more remote, non-transitory, machine-readable storage media communicatively coupled to the management system 104, or a combination thereof. In various embodiments, the database 114 may be non-volatile storage, including but not limited to flash memory, read-only memory (ROM), ferroelectric random access memory (fRAM), optical discs, solid-state devices (SSD), erasable programmable ROM (EPROM), electrically erasable programmable ROM (EEPROM), among others. When deploying a training cluster, the management system 104 can access the data structure in database 114 to determine the configuration parameters for each identified, deployed training cluster.

As a non-limiting example, the data structure can include at least one entry for each training cluster (e.g., TensorFlow1), the entry identifying the configuration parameters for the compute resources of the training cluster as deployed. The configuration parameters can include, but are not limited to, the name of the compute engine associated with the training cluster, the description of the training cluster, a list of names identifying the virtual nodes comprising the training cluster (e.g., fully qualified domain name (FQDN)), list of available services available on the virtual nodes of the training cluster, name and address of an application programming interface (API) server associated with the training cluster (e.g., FQDN), the TCP port for the API server associated with the training cluster, among other parameters such as an authentication token that may be required by the notebook client 112 to submit and execute the training model. When a request to remotely train a machine learning model, machine learning training source code is received from the notebook client 112, the management system 104 can identify the training cluster on which the training is to occur based on the request and retrieve the configuration parameters from the data structure in the database 114. The management system 104 can then add the configuration parameter information to the metadata of the remotely submitted machine learning model from the notebook client 112 so that the notebook code can be submitted to the identified training cluster for training.

Embodiments of the technology disclosed herein provide a framework wherein a single notebook instantiation can be used to design and build a machine learning model, with the ability to remotely submit the code for training without the need to know the underlying configuration parameters of the training environment. Specifically, as discussed above, the management system 104 can maintain holistic knowledge of the training clusters present within the environment 100. In this way, the data scientist, application programmer, or other user entering the code into the cells of the notebook client 112 can simply identify a target training cluster without the need to instantiate a specific notebook session for that particular training cluster. Rather, the user can submit the same notebook cells of the notebook client 112 for training in a variety of different compute engines by simply identifying a training cluster associated with that compute engine. The management system 104, maintaining the data structure in database 114 containing the configuration parameters for each training cluster, can identify the selected training cluster from the user and add the required configuration information necessary to submit the code to the target training cluster for training. The management system 104 can propagate the configuration parameters for specific machine learning models to the different training clusters for storage within the local databases of each training cluster.

In some embodiments, the management system 104 can provide the configuration parameters for a selected training environment to the notebook client 112. In such embodiments, the notebook client 112, upon receipt of the configuration parameters, can include those parameters in the metadata for the instantiated instance of the notebook client 112. When the user submits the model code for training in the selected training cluster, the notebook client 112

Figure 2:
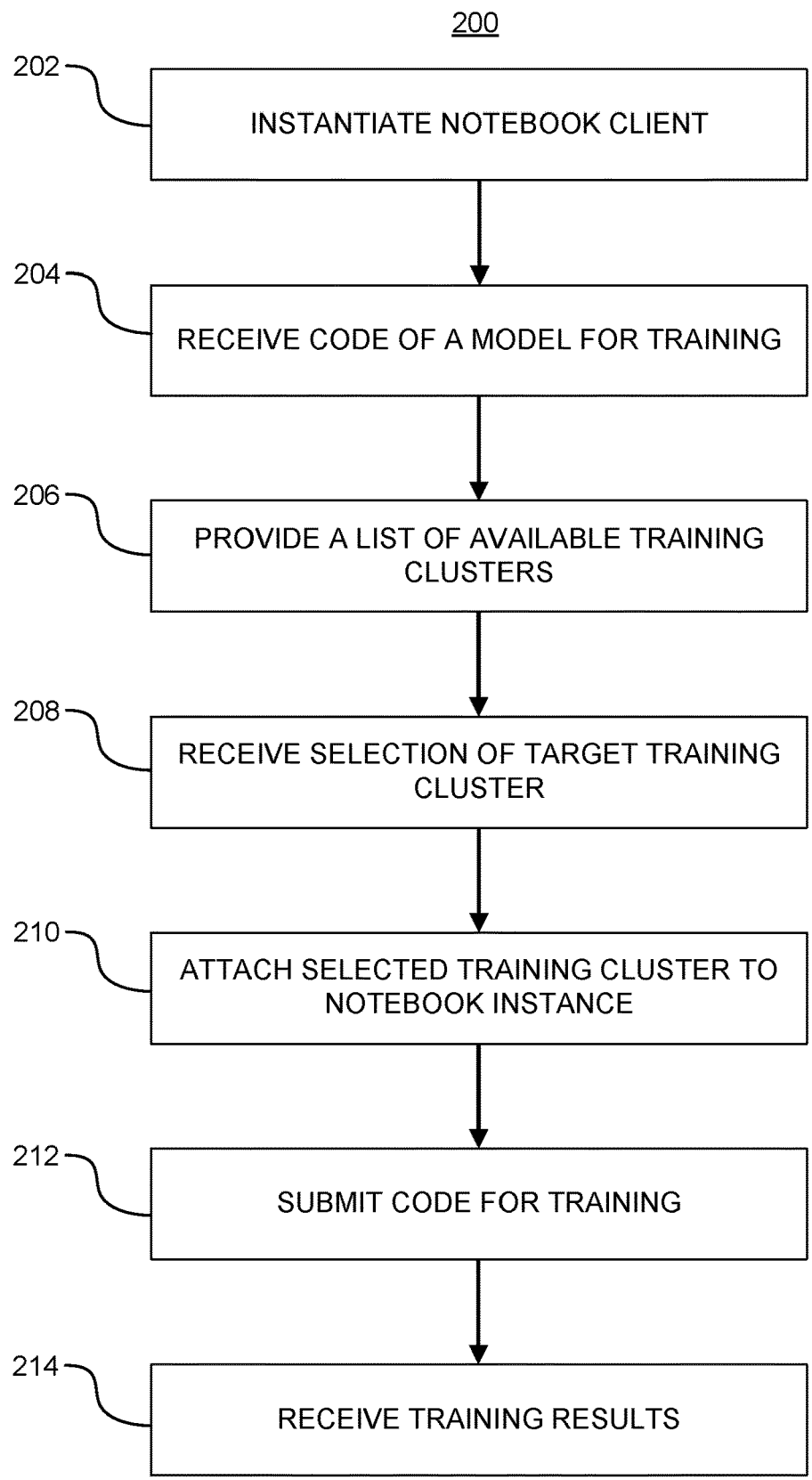
FIG. 2 is an example method in accordance with embodiments of the technology disclosed herein.

FIG. 2 illustrates an example method 200 in accordance with embodiments of the technology disclosed herein. The example method 200 is provided for illustrative purposes only and should not be interpreted as limiting the scope of the claims to only the depicted embodiment. The model 200 shows a process for submitting machine learning code for remote execution through a computational notebook, such as the notebook client 112 discussed with respect to FIG. 1. As shown in FIG. 2, the method 200 begins at operation 202 when an instance of the notebook client is instantiated. At operation 204, the instance of the notebook client receives code of a model for training. As discussed above, the model can be designed and built for a variety of different applications, including machine learning and data analytics, among others. For ease of discussion, the method 200 will be discussed with respect to submission of a machine learning model for training, but this discussion should not be interpreted as limiting the scope of the method 200 to only machine learning models. In various embodiments, the model may be received by a user entering the model code into the cells of the notebook client directly, while in other embodiments the model code may be received through loading of a non-transitory model code file from a storage medium (e.g., flash, ROM, etc.)

At operation 206, a list of available training clusters is provided to the user through the instance of the notebook client. As discussed above, the technology disclosed herein enables the user to select the compute engine of interest by selecting one of a plurality of available training clusters. In this way, the host system on which the notebook client is running (e.g., the user terminal 102 discussed with respect to FIG. 1) does not need to have the required runtime and training libraries for each compute engine stored locally (i.e., on the same system with the notebook client). In various embodiments, a plugin or other component for the notebook client may retrieve a listing of the available training clusters from a management system, similar to the management system 104 shown in FIG. 1. In some embodiments, the notebook client may request the listing of available training clusters when the notebook client is first initiated, while in other embodiments retrieving the listing of available training clusters may be triggered when a user indicates an intent to submit the model code for training. In some embodiments, the notebook client may update the listing of available training clusters in the background while the notebook client is in use. In some embodiments, the listing of available training clusters may be less than the total number of training clusters present within the environment 100.

At operation 208, the notebook client may receive a selection of a target training cluster. As discussed above, each of the available training clusters may be referred to by a different name. In some embodiments, the name of each training cluster may identify the type of compute engine running on the given training cluster, as discussed above with respect to FIG. 1. In some embodiments, one or more of the training clusters may be referred to by a name that does not indicate the associated compute engine. As a non-limiting example, the listing of available training clusters may include training clusters called "Tango," "Alabama," and "HQ." Upon receiving the selection, in some embodiments the selected training cluster can be identified in the metadata associated with the model code to be submitted for training. By including the selected target training cluster in the metadata of the model code to be submitted, the method 200 enables the management system (e.g., management system 104) to identify the associated training cluster in the data structure, thereby identifying the necessary configuration parameters for the compute engine of the selected training cluster. In some embodiments, the selected training cluster can be provided as a separate data element accompanying the model code during submission.

At operation 210, the selected training cluster can be attached to the instance of the notebook client. Attaching a training cluster comprises configuring the instance with the configuration parameters required to allow the model entered into the cells of the notebook instance to be submitted and executed within the compute environment of the selected training cluster. Current notebook clients require this information to be present during instantiation, resulting in the notebook instance being inexorably linked to the specific compute engine intended. Using the technology disclosed herein, the instance is capable of being instantiated, and model code is capable of being entered, regardless of the compute engine in which the model is to be trained/ tested. By attaching the training cluster independently, the same instance of the notebook client can be used to train a model on multiple compute engines without the need for multiple instances or sessions of the notebook client to be instantiated. Attaching the training cluster can comprise adding metadata associated with the configuration parameters for the selected training cluster to the metadata of the instance of the notebook client. By including the selected target training cluster in the metadata of the model code to be submitted, the method 200 enables the management system (e.g., management system 104) to identify the associated training cluster in the data structure, thereby identifying the necessary configuration parameters for the compute engine of the selected training cluster. In some embodiments, the selected training cluster can be provided as a separate data element accompanying the model code during submission. The metadata can include identification and addressing information for accessing the API server associated with the selected training cluster.

At operation 212, the model code and the training cluster selection is submitted to the training cluster for training. Through the attachment, the instance of the notebook client is capable of communicating with the training cluster such that the model code can be executed remotely in the training cluster without the need for the instance to be physically present on the training cluster machines. Moreover, with the metadata presented to the notebook client, the notebook client can directly make calls to the API server of the target training cluster without intervention from the management system 104. In various embodiments, submitting the code may comprise invoking a REST API call from the instance of the notebook client running on the user terminal (or user cluster) to the training cluster (e.g., to an API server associated with the selected training cluster). In this way, the instance of the notebook client is capable of interacting with the training cluster as if all of the required libraries for the compute engine are present locally (instead of remotely at the training cluster machines).

After the training cluster has executed the submitted model code, the notebook client receives the training results at operation 210. In various embodiments, the training results may be presented in a textual representation, a visual representation, or a combination thereof. In some embodiments, the training results may include additional configuration information, including the type of compute engine used to perform the training. It should be understood that the model code can be submitted to any training cluster irrespective of any runtime requirement(s), and the onus of selecting a particular training cluster to send the model code can be left to the programmer using the notebook client. It should be further noted that other types of information may be presented back to the user in/with the training results, e.g., real-time streaming logs and/or the results of an ongoing training job. In some embodiments, the method 200 may proceed to an optional operation 212, the notebook client may inquire of the user whether to submit the model code to any additional training clusters for training. Based on the results of the initial training, the user may want to determine how the model runs within another compute context.

Although discussed with respect to the notebook client instance, one or more of the operations discussed with respect to method 200 may be performed by a management system within the computing environment, such as management system 104 discussed with respect to FIG. 1. As a non-limiting example, in various embodiments operations 202-206 and 214 may be performed by the notebook client while operations 208-212 may be performed by the management system. In such embodiments, the management system may receive the contents of the notebook cells (containing the model code entered for training) from the instance or the notebook client with the selection of the target training cluster and attach the selected training cluster by adding the metadata of the training cluster to the metadata of the instance of the notebook client.

Figure 3:
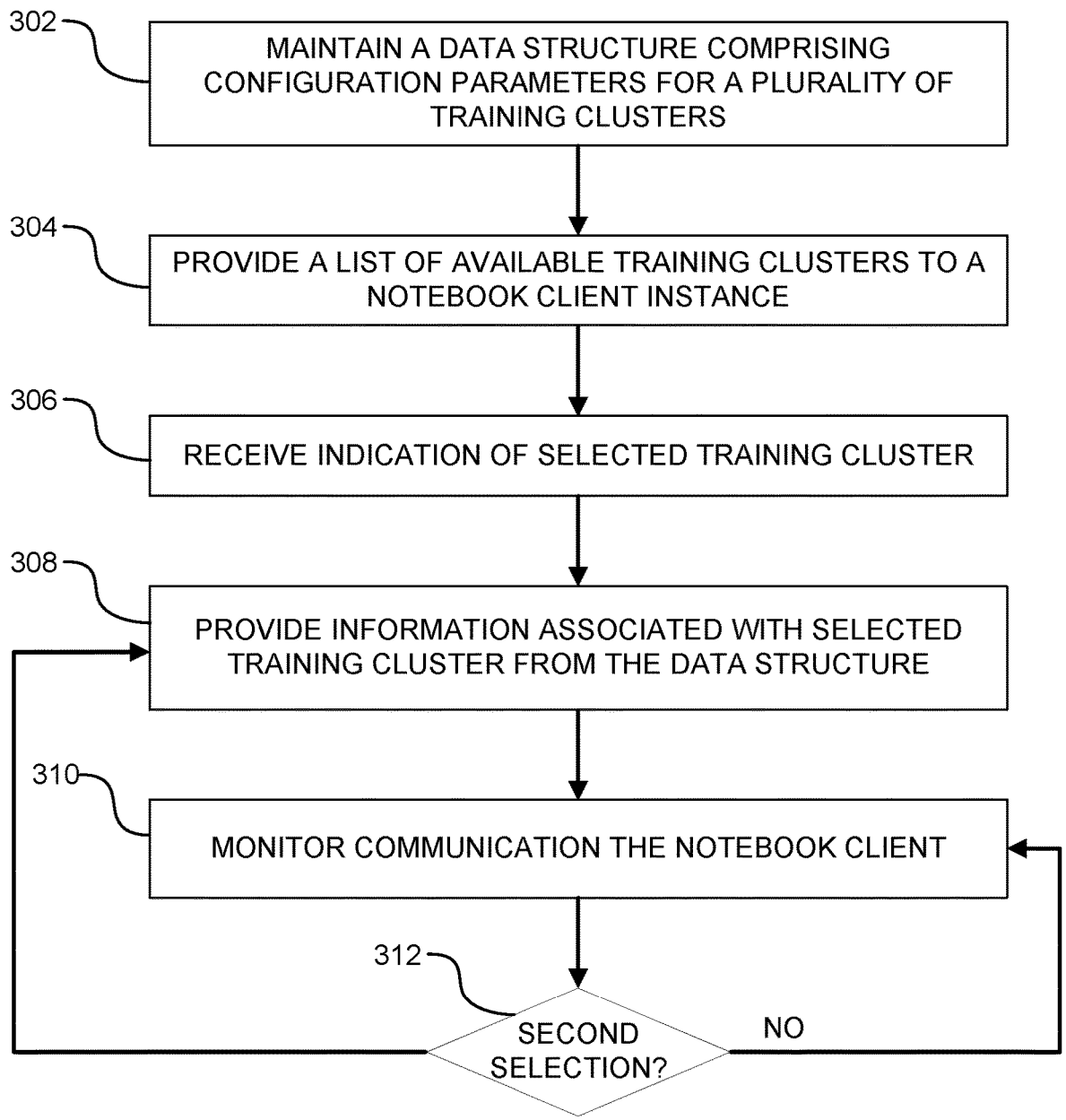
FIG. 3 is another example method in accordance with embodiments of the technology disclosed herein.

To enable the same notebook session to be used to train a model on different compute engines, the management system is configured to provide the required configuration parameters for a selected training cluster and attachment to a training cluster is separated from instantiation of the notebook instance. FIG. 3 provides another example method 300 in accordance with embodiments of the present disclosure. Like method 200, the method 300 is provided for illustrative purposes only and should not be interpreted to limit the scope of the technology disclosed herein to only the illustrative embodiment. In various embodiments, the method 300 may be performed by a management system, like management system 104 discussed with respect to FIG. 1. In some embodiments, the management system may be a separate host system from the training clusters and/or user terminal, while in other embodiments the management system may be implemented as a cluster of virtual nodes on one or more host systems.

At operation 302, the management system maintains a data structure comprising configuration parameters for a plurality of available training clusters. In various embodiments, the data structure may include a column including a cluster identifier and one or more columns of cluster parameters. The cluster identifier is a reference associated with each training cluster, like the cluster names discussed above with respect to FIGS. 1-2. Each cluster identifier is representative of each training cluster available within the computing environment. The one or more columns of cluster parameters can include the configuration parameters for the associated training cluster along the same row, such as the configuration parameters discussed above with respect to FIGS. 1 and 2. Although discussed as a single table, it should be understood that the management system may use one or more data structures that can comprise tables, linked lists, data trees, or some other data structure to maintain the configuration parameters for the plurality of available training clusters within the computing environment.

At operation 304, the management system may provide a list of the available training clusters to a notebook client instance. As discussed above with respect to FIG. 2, the instance of the notebook client is instantiated without being associated with a specific compute engine or training cluster. At operation 304, the management system can provide a list of the cluster identifiers to the instance so that the instance can present the available training clusters to the user for selection. In this way, the user is capable of designing and programming a machine learning model or other data analytics model irrespective of the compute engine used for training, being capable of using the same instance or notebook session to train the model on a variety of different compute engines by attaching a different training cluster. In various embodiments, operation 304 may comprise a push operation from the management system to the instance of the notebook client. The push operation may occur during instantiation of the instance in some embodiments, while in other embodiments the push operation may be triggered by a call from the instance of the notebook client indicative of a user intent to attach the instance to a training cluster. In various embodiments, the listing of available training clusters may be less than the total number of training clusters within the data structure. For example, in some instances one or more training clusters may not be available for a number of reasons, including but not limited to a lack of available resources for performing a training session. In such embodiments, the management system may be configured to determine at operation 304 whether a training cluster of the plurality of training clusters maintained in the data structure are available for use by the instance of the notebook client.

At operation 306, the management system can receive an indication of the selected training cluster from the instance. The indication may comprise the name of a selected training cluster from the plurality of available training clusters or some other indication unique to and associated with each of the training clusters available. After receiving the indication, the management system can provide information associated with the selected training cluster from the data structure at operation 308. In various embodiments, the information may be sent to the instance of the notebook client so that the notebook client can perform the attachment process discussed with respect to FIG. 2, while in other embodiments the information may be retrieved by the management system for its own use in performing the attachment process. As discussed above, the data structure may be maintained by the management system in a data repository, such as the database 114 discussed above with respect to FIG. 1. The information provided at operation 308 can include the configuration parameters for the training cluster required to enable remote submission and execution of the model within the training cluster, including the information discussed above with respect to FIGS. 1-2.

After providing the information from the data structure, the management system can monitor the instance of the notebook client running on the user terminal at operation 310. Monitoring the instance of the notebook client enables the management system to determine whether a second training cluster selection has occurred. This indicates that the user would like to train the model on another training cluster. If a subsequent selection is detected at decision 312, the method 300 can loop back to operation 308 and provide the information associated with the newly selected training cluster for use in attaching the training cluster to the current instance of the notebook client. In this way, rather than having to instantiate a new instance of the notebook client for a new training cluster (and, therefore, have to reenter the information into the cells of the new instance of the notebook client), the new training cluster can be attached by adding the provided information for the newly-selected training cluster to the same instance of the notebook client. In some embodiments, the management system may provide an updated listing of available training clusters to the instance of the notebook client at operation 310 where one or more training clusters are added or removed after operation 304, allowing the instance of the notebook client to provide the updated information to the user. In some embodiments, the updated listing may be performed through a push operation when a change in the available training clusters occurs or periodically, or an update can be performed in response to a request from the instance of the notebook client. If no subsequent selection is detected at decision 312, than the method 300 can continue to loop through the monitoring operation at operation 310. Although not shown, the method 300 can further include one or more operations for ending an instantiation of the notebook client.

Figure 4:
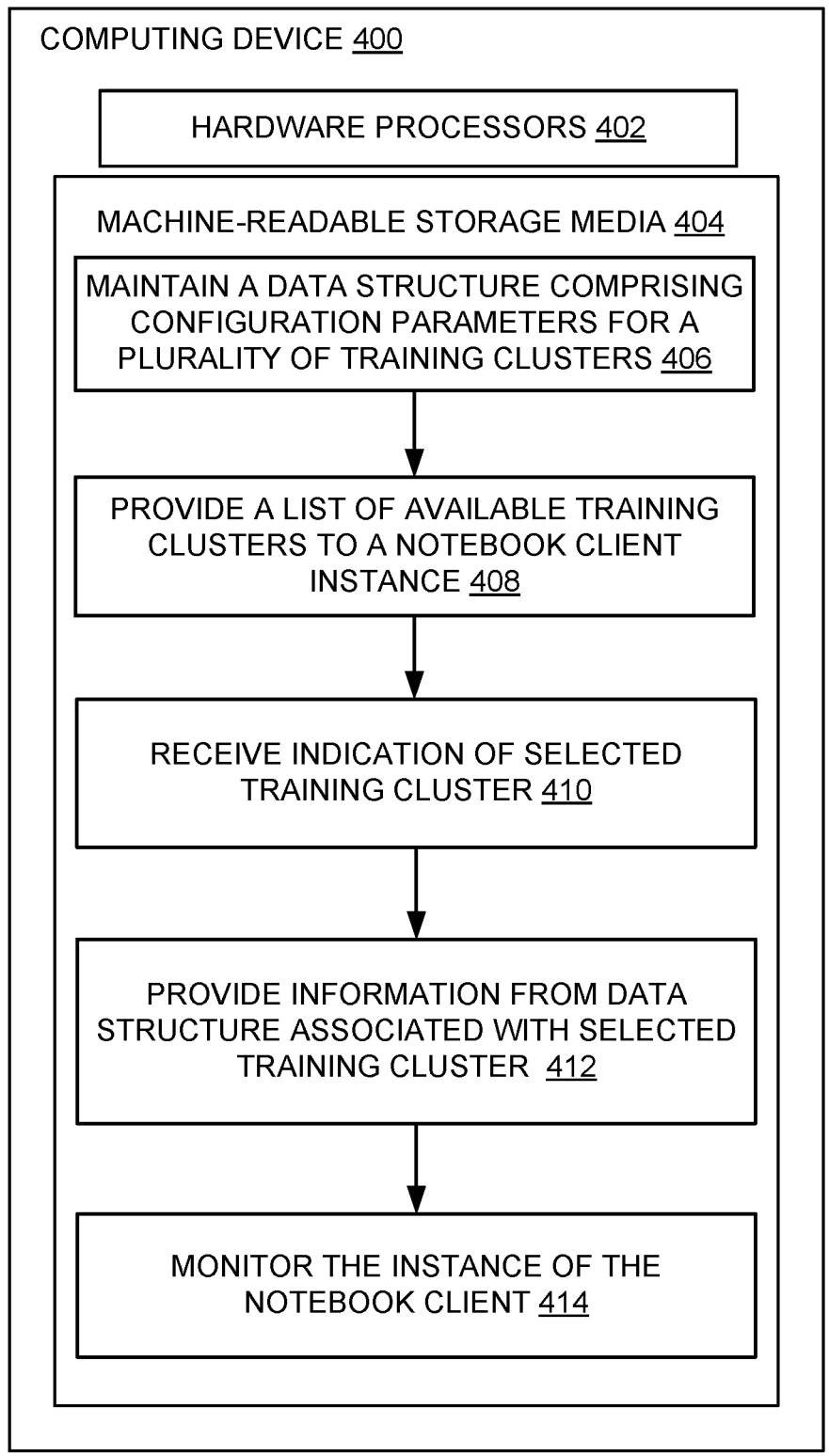
FIG. 4 is an example computing device having non-transitory machine-readable storage with instructions stored thereon in accordance with embodiments of the technology disclosed herein.

FIG. 4 is an example computing device 400 in accordance with embodiments of the present disclosure. Where operations and functionality of computing device 400 are similar to those discussed with respect to FIGS. 1-3, the description should be interpreted to apply. In various embodiments, the computing device 400 may the management system 104 discussed with respect to FIG. 1. The computing device 400 includes hardware processors 402. In various embodiments, hardware processors 402 may include one or more processors.

Hardware processors 402 are configured to execute instructions stored on a machine-readable medium 404. Machine readable medium 404 may be one or more types of non-transitory computer storage mediums. Non-limiting examples include flash memory, solid state storage devices (SSDs); a storage area network (SAN); removable memory (e.g., memory stick, CD, SD cards, etc.); or internal computer RAM or ROM; among other types of computer storage mediums. The instructions stored on the machine-readable medium 404 may include various sub-instructions for performing the function embodied by the identified functions. For example, the instructions "maintain a data structure comprising configuration parameters for a plurality of training clusters" 406 may include various sub-instructions for creating the data structure and storing the data structure in the repository in a manner similar to that discussed above with respect to FIGS. 1-3. The instruction "provide a list of available training clusters to a notebook client instance" 408 may include sub-instructions for generating and communicating a listing of the available training clusters in the environment in a manner similar to that discussed with respect to FIGS. 1-3. The instruction 408 may further include sub-instructions for determining when a change in the number of available training clusters occurs within the computing environment and providing an updated list.

The instruction "receive indication of selected training cluster" 410 may include sub-instructions for the communicating with the instance of the notebook client in a manner similar to that discussed above with respect to FIGS. 1-3. The instruction "provide information from data structure associated with selected training cluster" 412 may include sub-instructions for the retrieving configuration parameters from the data structure for the selected training cluster in a manner similar to that discussed above with respect to FIGS. 1-3. The instructions 412 may further include sub-instructions for determining the configuration parameters required for attaching a training cluster to an instance of the notebook client. The instruction "monitor the instance of the notebook client" 414 may include sub-instructions for monitoring requests to and from the instance of the notebook client in a manner similar to that discussed above with respect to FIGS. 1-3. The instruction 414 may further include sub-instructions for determining if a different training cluster is selected through the instance of the notebook client.

Figure 5:
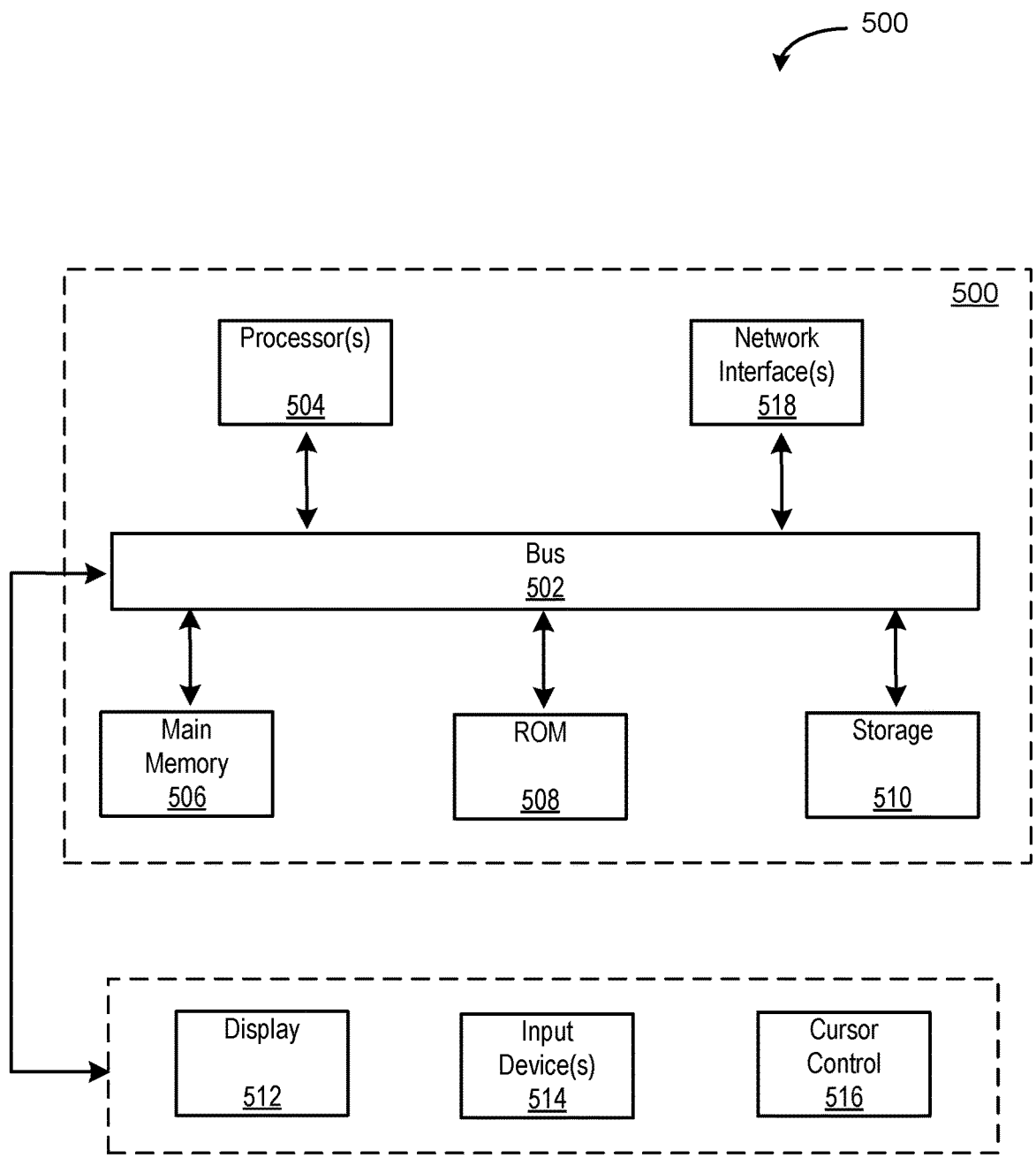
FIG. 5 is an example computing component that may be used to implement various features of embodiments described in the present disclosure.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
    maintaining, by a management system, at least one data structure including configuration parameters for each one of a plurality of training clusters within a computing environment;
    instantiating an instance of a notebook client on a user terminal without attaching the instance to a specific compute engine;
    providing, by the management system, a listing of available training clusters to an instance of the notebook client on the user terminal;
    receiving, by the management system, an indication of a selected training cluster from the listing of available training clusters from the instance of the notebook client; and
    providing, by the management system, a plurality of configuration parameters associated with the selected training cluster for use in attaching the selected training cluster to the instance of the notebook client,
    wherein each training cluster of the plurality of training clusters locally stores one or more runtime libraries associated with a compute engine, and the instance of the notebook client is unaffiliated with the compute engine until after attachment of the selected training cluster to the instance.

2. The method of claim 1, wherein each training cluster comprises one or more virtual nodes of one or more host systems communicatively coupled to the management system.

3. The method of claim 2, wherein each training cluster further comprises an application programming interface (API) server configured to enable communication between the instance and the respective training cluster.

4. The method of claim 1, further comprising submitting code received by the instance of the notebook client to the selected training cluster for training at the selected training cluster after attaching the selected training cluster to the instance.

5. The method of claim 1, further comprising determining the listing of available training clusters from the plurality of training clusters.

6. The method of claim 1, wherein attaching the selected training cluster to the instance comprises adding metadata of the selected training cluster to metadata of the instance.

7. The method of claim 1, further comprising monitoring, by the management system, the instance of the notebook client and determining if a subsequent training cluster is selected.

8. The method of claim 1, further comprising updating, by the management system, the listing of available training clusters.

9. A system comprising:
    a user terminal having a notebook client running thereon;
    a plurality of training clusters; and
    a management system communicatively coupled to the user terminal and the plurality of training clusters, wherein the management system is configured to:
        maintain at least one data structure including configuration parameters for each one of the plurality of training clusters and a cluster identifier for each training cluster of the plurality of training clusters;
        provide a listing of available training clusters to an instance of the notebook client on the user terminal;
        receive an indication of a selected training cluster from the listing of available training clusters from the instance of the notebook client; and
        provide a plurality of configuration parameters associated with the selected training cluster for use in attaching the selected training cluster to the instance of the notebook client,
    wherein each training cluster of the plurality of training clusters locally stores one or more runtime libraries associated with a compute engine, and the instance of the user terminal is unaffiliated with the compute engine until after attachment of the selected training cluster to the instance.

10. The system of claim 9, wherein each training cluster of the plurality of training clusters comprises one or more virtual nodes of one or more host systems.

11. The system of claim 10, wherein the management system and at least one training cluster are deployed on a same host system.

12. The system of claim 9, wherein the data structure comprises one of tables, linked lists, data trees, or a combination thereof.

13. The system of claim 9, the management system further configured to monitor the instance of the notebook client and determining if a subsequent training cluster is selected.

14. The system of claim 13, wherein attaching the selected training cluster to the instance comprises adding metadata of the selected training cluster to metadata of the instance.

15. A non-transitory machine-readable storage medium storing instructions thereon that, when executed by a processor, cause the processor to:
    maintain at least one data structure including configuration parameters for each one of a plurality of training clusters within a computing environment;
    instantiate an instance of a notebook client on a user terminal without attaching the instance to a specific compute engine;
    provide a listing of available training clusters to an instance of the notebook client on the user terminal;
    receive an indication of a selected training cluster from the listing of available training clusters from the instance of the notebook client; and
    provide a plurality of configuration parameters associated with the selected training cluster for use in attaching the selected training cluster to the instance of the notebook client,
    wherein each training cluster of the plurality of training clusters locally stores one or more runtime libraries associated with a compute engine, and the instance of the user terminal is unaffiliated with the compute engine until after attachment of the selected training cluster to the instance.

16. The non-transitory machine-readable storage medium of claim 15, wherein attaching the selected training cluster to the instance comprises adding metadata of the selected training cluster to metadata of the instance.

17. The non-transitory machine-readable storage medium of claim 15, further comprising instructions stored thereon that, when executed by the processor, cause the processor to determine the listing of available training clusters from the plurality of training clusters.

18. The method of claim 1, wherein the management system and at least one training cluster are deployed on a same host system.

19. The system of claim 9, wherein the management system is configured to provide the listing of available training clusters to the instance of the notebook client on the user terminal upon one of initiation of the notebook client, upon receipt of any indication to submit model code for training, or while the notebook client is in use.

20. The non-transitory machine-readable storage medium of claim 15, wherein the instructions that cause the processor to provide the listing of available training clusters to the instance of the notebook client on the user terminal are triggered upon one of initiation of the notebook client, upon receipt of any indication to submit model code for training, or while the notebook client is in use.

\* \* \* \* \*